United States Patent [19]

Lotz

[11] Patent Number: 4,703,439
[45] Date of Patent: Oct. 27, 1987

[54] VIDEO PROCESSOR FOR REAL TIME OPERATION WITHOUT OVERLOAD IN A COMPUTER-GENERATED IMAGE SYSTEM

[75] Inventor: Robert W. Lotz, Scotts Valley, Calif.

[73] Assignee: The Singer Company, Binghamton, N.Y.

[21] Appl. No.: 678,205

[22] Filed: Dec. 5, 1984

[51] Int. Cl.⁴ .................... G06F 15/62; G09G 1/16
[52] U.S. Cl. .................................. 364/521; 340/723; 340/747
[58] Field of Search ............ 364/522, 518, 521; 358/103, 104, 133, 135, 136; 434/43; 340/723, 728, 744, 747, 731, 736, 739, 812, 814

[56] References Cited

U.S. PATENT DOCUMENTS

| | | | |
|---|---|---|---|
| 4,152,766 | 5/1979 | Osofsky et al. | 358/104 Y |
| 4,435,703 | 3/1984 | Hunt et al. | 340/723 |
| 4,481,509 | 11/1984 | Sasaki et al. | 364/518 X |
| 4,570,233 | 2/1986 | Yan et al. | 340/723 X |
| 4,604,614 | 8/1986 | Farr et al. | 340/723 X |

Primary Examiner—Arthur T. Grimley
Assistant Examiner—J. Pendegrass
Attorney, Agent, or Firm—Douglas M. Clarkson; Barry L. Haley

[57] ABSTRACT

The disclosure describes a circuit to avoid overloading a computer-generated image system with limited capacity for processing image data in real time. A circuit that is constructed and arranged according to this description avoids such overloads by varying the resolution of the image in real time under the control of a real-time control computer.

8 Claims, 4 Drawing Figures

VIDEO PROCESSOR FOR REAL TIME OPERATION WITHOUT OVERLOAD IN A COMPUTER-GENERATED IMAGE SYSTEM

BACKGROUND OF THE INVENTION

The present invention, generally, relates to the field of simulation and, more particularly, to a computer-generated image system with limited data processing capacity for real-time operation.

In previous scanline type of computer-generated image systems, there was a limitation on the total number of polygon edge crossings per scanline. It was necessary to arrange databases such as to avoid exceeding this limit. Since this parameter can change rapidly line to line and from frame to frame, it has not been possible to use measurements taken at the output in order to control image content, such as to prevent overload in real-time operation.

In the event that overload occurred, the video from the last previous non-overload scanline was repeated for the current scanline. The result was a vertical stretching of the image in the area of the overload. This anomaly was less objectionable than the streaks which would appear if the overload line were displayed.

In the simulator field which today uses increasingly the computer-generated image system, a somewhat similar type of overload can occur if the pixel processors do not have time to complete the processing of a field before the field is due to be displayed. It might be possible to redisplay the last non-overload field until the overload problem could be corrected, but this would result in distracting discontinuity of motion.

Alternatively, it may be possible to delay the start of display of a new field until the processing is completed. This would be difficult to accommodate in the display system and would likely result in intensity fluctuation or "flicker".

The fact that an overload occurs on a field rather than on an individual scanline means that changes in loading are based on the average over the field and occur more gradually than in a scanline type system which overloads due to peak conditions occurring on a single scanline. This fact permits data taken on one field to be used to correct the loading on subsequent fields.

This load correction can be accomplished by changing the switching distances which control the level of detail with which scene elements are portrayed. However, the strategy for changing smoothly various levels of detail calls for the use of transparency, which causes increased load on a video processor.

Also, some instances of use call for very rapid field to field changes in scene content. In this case, the data taken from a previous field cannot be used to adjust the scene content of the following field, because this technique would result in abrupt and distracting changes in scene content.

Accordingly, it is a principal object of the present invention to provide in a computer-generated image system a way of avoiding any overload to cause such image degradation.

It is also an object of the present invention to provide a means of preventing overload in the video processor portion of a computer-generated image system, particularly as used in the simulation field.

SUMMARY OF THE INVENTION

The present invention provides a means of avoiding overloads by varying the resolution of the image in real time under control of a real-time control computer. This is accomplished in a computer-generated image system that processes image data in real time with limited image data processing capacity.

Such a computer-generated image system includes a geometric processor circuit to generate data signals representing predetermined object faces for use in scenes formed by a display device. In addition, there is a video processor circuit connected to receive those signals generated by the geometric processor circuit to provide predetermined scene content features using those data signals representing the object faces. All of these circuits are coordinated, clocked and otherwise controlled by a real-time computer, as will be explained in more detail hereinafter.

BRIEF DESCRIPTION OF THE DRAWINGS

The various features and advantages of the present invention will be understood more readily with reference to the following detailed description taken in conjunction with the accompanying drawings, in which.

DETAILED DESCRIPTION

Figure 1:
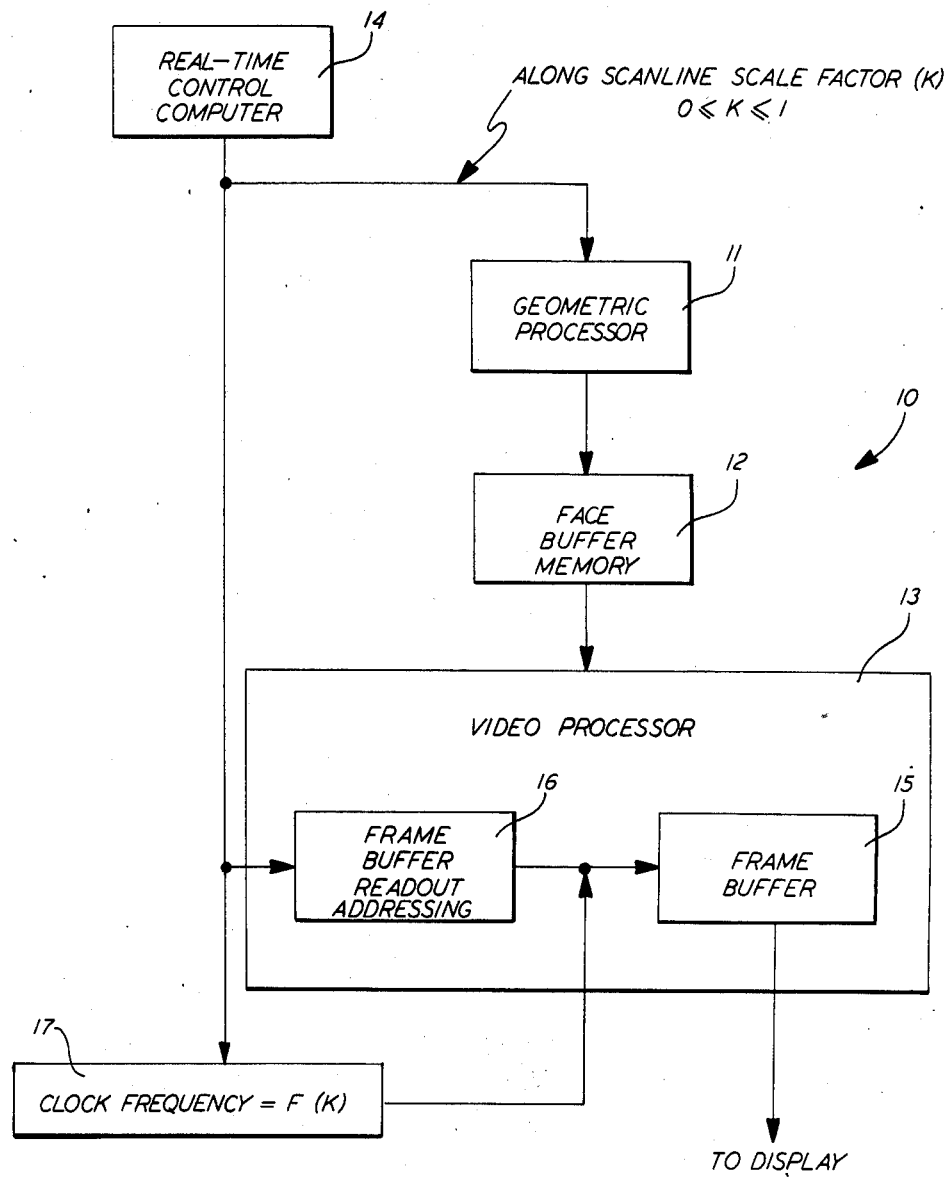
FIG. 1 is a block diagram of a circuit to show the interconnections and the arrangement of component parts in accordance with the principles of the invention.

Referring now to FIG. 1 of the drawings, the reference numeral 10 identifies generally major circuit component parts interconnected as would be used in a computer-generated image system. These component parts essentially include a geometric processor circuit 11 as is well-known in the art.

The geometric processor circuit 11 generates signals representing object faces, and these signals are collected and arranged in a face buffer memory circuit 12. The object faces, then, are connected to the usual video processor circuit 13, also as is well known for the type of computer-generated image system 10.

For more details of a computer-generated image system 10 with which the present invention is uniquely adapted to function so effectively, reference is made to a co-pending patent application Ser. No. 394,229 filed July 1, 1982 by J. K. Florence and J. K. Yan entitled "Modular Digital Image Generator". This patent application is assigned to the same Assignee as the present invention and has issued now as U.S. Pat. No. 4,570,233.

The invention avoids overloads, in the presently preferred embodiment, by varying the horizontal resolution of the image in real time under the control of a real-time control computer 14. Once the real-time computer 14 has determined the number of picture elements per scanline to be processed for the subsequent field, the data is passed to the geometric processor circuit 11, which uses it to adjust the horizontal scaling of the object faces, or polygons, sent to the face buffer memory circuit 12.

The video processor circuit 13, then, will process these polygons in exactly the same manner as it would have if they had not been rescaled. The resulting image written in a frame buffer 15 will be compressed in the horizontal direction in accordance with the scale factor.

Once the writing into the frame buffer 15 is complete, it can be read out for display on the following field. The only change to the video processor circuit 13 required for implementation of the present invention is that the clock rate for readout of picture elements from the frame buffer 15 must be made variable under control of the real-time control computer 14 as illustrated in FIG. 1 of the drawings by a frame buffer readout addressing circuit 16 and a clock 17.

The clock rate is varied in such a manner as to keep the active scanline time, which equals picture elements per scanline divided by the clock frequency, equal to a constant. Of course, there are several different ways to develop the factor "K", as well as to rescale the factor "K" also, other than by the real-time control computer 14.

An alternative implementation would rescale the object face data as it is read out from the face buffer memory circuit 12. However, this alternative implementation requires additional hardware at the output of the face buffer memory circuit 12, but it produces in one field interval less transport delay before the result appears at the output terminal.

One means to maintain a fixed phase relationship between the variable picture element clock and the fixed rate horizontal synchronization is as follows: a stable fixed rate clock is used to generate the required raster timing, including horizontal and vertical sync, blanking, and equalization pulses.

Then, a voltage controlled oscillator is operated in a phase locked loop to generate the desired picture element clock in response to a digital command input. The phase locked loop will force the picture element clock to remain fixed in phase relative to the horizontal sync.

The frequency switching is done at the start of vertical retrace in order to allow the picture element clock ample time to attain correct phase lock before the start of display of the subsequent field.

In the presently preferred embodiment of the invention, the geometric processor circuit 11 is programmable in terms of picture elements per scanline under real-time control computer 14. Since, by this means, the picture elements per scanline and the output clock rate in the video processor circuit 13 are also under the control of the real-time control computer 14, this mechanism is used to avoid video processor overloads.

The point in the above is to vary the number of picture elements while holding the active scanline time constant. The result is a decrease in horizontal resolution which has been found not to be objectionable in the presence of effective anti-aliasing.

Figure 2:
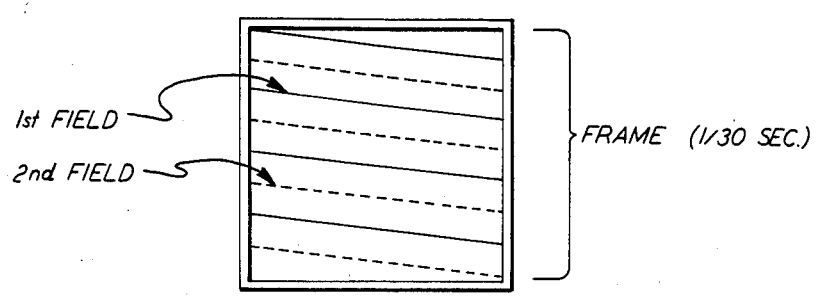
FIG. 2 is an illustrative view of a display device, such as a cathode ray tube, as an aid in describing the invention.
Figure 3:
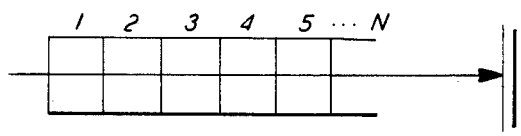
FIG. 3 of the drawings is an illustration of picture elements along a scanline as an aid in describing the invention.
Figure 4:
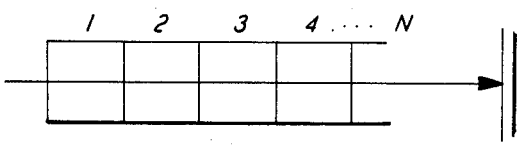
FIG. 4 of the drawings is a view similar to FIG. 3, but showing a reduced number of picture elements.

FIGS. 2, 3, and 4 are provided to illustrate the above points better. For example, in FIG. 2, the first field is illustrated by the solid lines and a second field is illustrated by dashed lines in order to make up one frame in approximately one-thirtieth of a second.

In FIGS. 3 and 4, an effect is illustrated of the reduction along a scanline of the number of picture elements by a factor of about 20%. This decrease in horizontal resolution is virtually imperceptible, particularly when compared with alternative methods of avoiding overload such as reducing scene content or by extending the field display time.

Thus, there has been described a new, unique, and improved circuit for avoiding overload in a video processor as used particularly in computer-generated image systems that operate in real time. However, it is understood that this new, unique and improved circuit is described only as illustrative of one of many specific embodiments that represent applications of the principles of the present invention.

Clearly, numerous and varied other arrangements may be devised readily by those skilled in the art without departing from the true spirit and scope of the invention. Accordingly, it is not intended to confine the invention to the form of embodiment disclosed herein, because it is susceptible of embodiment in various other forms within the scope of the appended claims.

I claim:

1. In a computer-generated image system adapted to process image data in real-time and having predetermined image data processing capacity, comprised of:

geometric processor means programmable to generate data signals in terms of pixels per scanline representing predetermined object faces for use in scenes formed by a raster scan display device, video processor means connected to receive signals from said geometric processor means to process predetermined scene content features using said data signals representing predetermined object faces, means to prevent overload of said video processor means including means to vary resolution of the visual scenes in real time;

real-time control means connected to control a clock under which the image data generated by both said geometric processor means and said video processor means is read out in real time for said display device, said real-time control means being a control computer adapted to control the operation of said geometric processor means to vary a scale factor (K) in the direction of a scan line, where K is equal to or greater than zero and is equal to or less than one, said video processor means including frame buffer memory to store and to retrieve said data signals representing predetermined object faces, and frame buffer read out addressing means connected to said frame buffer memory means to vary the addressing of said data signals and connected to said clock to achieve a ready retrieval of said data signals.

2. In a computer-generated image system as set forth in claim 1 including means to vary said clock under which said video processor means operates in real time as a function of K.

3. In a computer-generated image system as set forth in claim 1 wherein said real-time control means is in the form of a control computer adapted to control the varying of said resolution on a field-to-field basis.

4. In a computer-generated image system as set forth in claim 3 wherein said control computer varies said resolution by varying the video output clock frequency and by directly varying the scale factor of the number of picture elements per scanline in the geometric processor.

5. In a computer-generated image system as set forth in claim 1 wherein said frame buffer readout addressing means includes in its connection to said frame buffer memory means an output connection from a means to vary clock frequency in a predetermined manner.

6. In a computer-generated image system as set forth in claim 5 wherein said predetermined manner of varying clock frequency varies the number of picture elements per scanline in order to vary the resolution of the scenes in real time.

7. In a computer-generated image system as set forth in claim 6 including real-time control means connected to vary the operation of said geometric processor means along a predetermined scanline scale factor.

8. In a computer-generated image system as set forth in claim 7 wherein said means to vary the resolution of said visual scenes in real time includes means to vary the clock frequency of said video processor means directly with a varying of the scale factor in said geometric processor means.

* * * * *